(12) United States Patent
Haimer et al.

(10) Patent No.: US 9,205,496 B2
(45) Date of Patent: Dec. 8, 2015

(54) SHRINK FIT CHUCK HAVING EXTENSION GROOVES

(75) Inventors: Franz Haimer, Hollenbach/Igenhausen (DE); Joseph Haimer, Igenhausen (DE); Bernhard Regau, Unterwittelsbach (DE)

(73) Assignee: Franz Haimer Maschinenbau KG, Hollenbach (DE)

( * ) Notice: Subject to any disclaimer, the term of this patent is extended or adjusted under 35 U.S.C. 154(b) by 1016 days.

(21) Appl. No.: 13/061,427

(22) PCT Filed: Aug. 10, 2009

(86) PCT No.: PCT/EP2009/005805
§ 371 (c)(1),
(2), (4) Date: Jun. 28, 2011

(87) PCT Pub. No.: WO2010/022858
PCT Pub. Date: Mar. 4, 2010

(65) Prior Publication Data
US 2011/0248455 A1 Oct. 13, 2011

(30) Foreign Application Priority Data
Aug. 28, 2008 (DE) .......................... 10 2008 045 233

(51) Int. Cl.
*B23B 31/117* (2006.01)
*B23B 31/02* (2006.01)

(52) U.S. Cl.
CPC ............. *B23B 31/02* (2013.01); *B23B 31/1179* (2013.01); *Y10T 279/17* (2015.01); *Y10T 279/17153* (2015.01); *Y10T 279/17957* (2015.01)

(58) Field of Classification Search
CPC ............. B23B 31/1179; B23B 31/117; B23B 2240/28; B25G 3/10
USPC ........... 279/102, 9.1, 23.1, 96, 103; 408/143; 409/141; 29/447
See application file for complete search history.

(56) References Cited

U.S. PATENT DOCUMENTS 4,314,396 A * 2/1982 Nunlist et al. ................... 29/889
5,311,654 A * 5/1994 Cook .............................. 29/447

(Continued)

FOREIGN PATENT DOCUMENTS

CN   1988975 A   6/2007
DE   10102710 A1  9/2002

(Continued)

OTHER PUBLICATIONS

Bauer, W., English translations of German Patent No. DE 10244759A1, "Chuck for thermal shrink-wrapping of shafts has deep radial annular groove in receiver close to shell endface", Apr. 15, 2014.*

*Primary Examiner* — Eric A Gates
*Assistant Examiner* — Chwen-Wei Su

(57) ABSTRACT

The invention relates to a tool holder comprising a tool receptacle in the form of a sleeve part, which comprises a tool receptacle opening comprising a mating surface which is concentric with the axis of rotation of the tool holder and on which the shaft of a tool inserted in accordance with the intended purpose thereof into the tool receptacle opening of the sleeve part can be fixed in a press fit, wherein the sleeve part comprises a number of circumferential recesses from the side of the mating surface, wherein the recesses divide the mating surface into several mating surface segments which are comparable to each other and which are substantially inherently rigid in the axial direction, wherein the radial depth of the recesses is selected such that the press fit releases substantially uniformly on all mating surface segments under the influence of heat applied over the outer circumference of the sleeve part.

6 Claims, 3 Drawing Sheets

(56) References Cited

U.S. PATENT DOCUMENTS

| | | | |
|---|---|---|---|
| 6,280,126 B1* | 8/2001 | Slocum et al. | 409/141 |
| 7,367,763 B2 | 5/2008 | Ruy Frota de Souza | |
| 2007/0140803 A1 | 6/2007 | Filho | |
| 2007/0246899 A1* | 10/2007 | Haimer | 279/9.1 |
| 2009/0033043 A1* | 2/2009 | Haimer et al. | 279/102 |

FOREIGN PATENT DOCUMENTS

| | | |
|---|---|---|
| DE | 10244759 A1 | 4/2004 |
| DE | 102004042770 A1 | 12/2005 |
| JP | 2001105208 A | 4/2001 |
| JP | 2001353634 A | 12/2001 |

* cited by examiner

SHRINK FIT CHUCK HAVING EXTENSION GROOVES

FIELD OF THE INVENTION

The invention relates to a tool holder for a tool that can be rotated around a rotation axis, particularly in the form of a drill, a milling tool, or a reaming tool.

BACKGROUND OF THE INVENTION

It is known to secure the shank of such a tool in an annular, intrinsically closed tool holder. For this purpose, in its tool receiving opening, the sleeve part has a mating surface, which is concentric to the rotation axis of the tool holder and to which the shank of the tool can be fastened in a press fit.

The sleeve part of the tool holder can be expanded with heat in the radial direction until the cold shank of the tool can be brought into or out of engagement with the mating surface of the sleeve part, i.e. can be inserted into the sleeve part or removed from it. As soon as the sleeve part has cooled again, a press-fit connection is established between it and the tool shank, which is slightly larger than the mating surface of the sleeve part. This press-fit connection reliably secures the tool in the tool holder (shrink-fit technology).

Tool holders whose sleeve part is embodied with thick walls are particularly used in practical applications with special requirements regarding rigidity. Constant problems arise when unclamping tools from tool holders of this kind.

In order to be able to unclamp the tool again at a particular time, it is common practice to use an inductive heating device, i.e. a high-frequency induction coil that induces eddy currents at the outer circumference surface of the sleeve part, which heat the sleeve part from the outside. As this occurs, the shank of the tool to be unclamped is shielded so that the shank itself is not heated. Particularly at high frequencies, the so-called skin effect occurs; in other words, the heat-generating eddy currents are actually induced only a short distance beneath the surface of the sleeve part. The heat thus generated beneath the surface of the outer circumference surface of the sleeve part does penetrate in the direction of the middle of the sleeve through heat conduction, but only in a delayed fashion. At a particular point in time, the heat introduced into the sleeve part has caused it to expand until the shank of the tool, which is still cold at that point, can be removed from the sleeve part because the previously existing press fit has been released due to the increase in the diameter of the sleeve part.

With increasing thickness of the sleeve part in the radial direction, however, problems arise in this regard. The thicker the sleeve part is in the radial direction, the more unevenly it is heated—at some point, a stage arrives in which the sleeve part has already been heated fairly heavily in the region of the outermost radii while it remains relatively cold in the region of the innermost radii. This results in relatively powerful thermal stresses. The outer region of the sleeve part that is not only expanding in the radial direction, but also elongating a significant amount in the axial direction demonstrates a perceptible tendency to bend the sleeve part inward once its elongation in the axial direction is hindered too forcefully by the still cold inner region. This looks (schematically depicted) approximately like the depiction in FIG. 1, in which it is shown in very exaggerated fashion for the sake of better visibility.

This unwanted deformation of the sleeve part is counterproductive since as a result of it, the tool shank initially continues to be locally clamped by the mating surface even though the sleeve part has already expanded far enough that a large part of the mating surface has disengaged from the tool shank. At the very least, this reduces the window of time during which the tool shank can be smoothly withdrawn from the sleeve part. This is not desirable. In addition, forcing the sleeve part to expand far enough for its mating surface to truly disengage from the tool shank at all locations requires the transmission of an unnecessarily large amount of heat to the sleeve part. This is also undesirable.

In order to avoid these problems, it is common practice to keep the wall thicknesses of the sleeve parts to the minimum possible. For this reason, according to DIN 69882-8, standard shrink-fit chucks have the following wall thicknesses at their tips (measured in mm):

| Clamping diameter | Wall thickness |
|---|---|
| 6 | 7.5 |
| 8 | 6.5 |
| 10 | 7.0 |
| 12 | 6.0 |
| 14 | 6.5 |
| 16 | 5.5 |
| 18 | 7.5 |
| 20 | 6.5 |
| 25 | 9.5 |
| 32 | 6.0 |

German patent DE 102 44 759 has already attempted to solve the problem of the unwanted deformation of the sleeve part. In order to prevent the unwanted deformation, this patent proposes sinking a deeply incised radial annular groove into the mating surface all the way in front, in the region of the tip of the sleeve part, which groove delimits the front region of the actual mating surface. This is based on the idea that the thus weakened region at the tip of the sleeve part is able to expand unhindered in the radial direction, consequently preventing the sleeve part from bending inward too much in the region of its tip. Therefore, DE 102 44 759 can be said to be generally based on the concept of counteracting the unwanted inward bending of the tip region of the sleeve part by overlaying this with an opposite effect.

The cited patent also proposes delimiting the mating surface by means of an additional annular groove at its inward end oriented away from the tool. The actual mating surface, however, which the cited patent refers to as the "main clamping surface 13," is not interrupted by annular recesses in the embodiment proposed according to the cited patent, but rather, merely bordered by the annular grooves at both ends.

Other remedies proposed by the cited patent include, if necessary, providing additional grooves extending in the axial direction, which divide the mating surface or main clamping surface into individual elastic segments that each constitute a kind of spring leaf and are situated next to one another in the circumference direction.

The measures proposed by the cited patent, however, are insufficient, particularly in tool holders with thick-walled sleeve parts and—if the axial grooves proposed by the cited patent are also used for controlling the problem of sleeve part warpage—result in a loss of precision and also weaken the press fit. In addition, the greatest forces (bending moments and transverse forces from the tool) are transmitted right in the front region of the sleeve part. A weakening of the sleeve part in this region therefore results in a sharp reduction in rigidity even if no axial grooves are used and should therefore be avoided.

The German patent application DE 10 2004 042 770 also describes a tool holder with a sleeve part into which the shank of a tool can be shrink-fitted. The mating surface, which is provided for this purpose on the inside of the sleeve part of this tool holder, is interrupted by a series of narrowly spaced recesses and is divided into individual, very narrow segments. The reason for this division of the mating surface into individual, small segments is to turn the small segments into barbs of a sort, which provide an increased resistance to an unwanted removal of the tool shank in the axial direction. This is because the small segments are, generally speaking, conceived so that due to static friction, they are carried along by the tool shank when the latter is withdrawn a short distance in the axial direction. The flexibility of these small segments causes them to lift up, thus increasing the pressure between the sleeve part and the tool shank. This therefore achieves a kind of self-locking.

Since the sleeve parts of the tool holders disclosed by the cited patent application clearly have only the conventional wall thickness, the recesses used here do not have any perceptible influence on the expansion behavior of the sleeve part during heating. This is because with thin walls, the still cold inner region is "pulled along" by the already hot outer region, i.e. either way, it is expanded sufficiently to permit unhindered insertion and primarily also subsequent removal of the tool shank.

Naturally, such a design in which the mating surface in the sleeve part is divided up into nothing but small, flexible segments is not particularly rigid.

By contrast, the object of the present invention is to disclose a tool holder whose sleeve part can be embodied with thick walls and permits an extremely rigid clamping of the tool with superior quality centering.

SUMMARY OF THE INVENTION

Accordingly, an essential aspect of the invention is the fact that the sleeve part has a limited number of circumferential recesses extending in from the mating surface, which divide the mating surface into a plurality of mating surface segments that are essentially intrinsically rigid in the axial direction. The radial depth of the recesses is selected so that the press fit releases in an essentially uniform fashion at all mating surface segments under the influence of heat applied over the outer circumference of the sleeve part.

According to the invention, the mating surface is thus divided into individual segments that are essentially decoupled from one another as a rule. The mating surface here is not merely divided into a mating surface segment, which is mainly responsible for producing the press-fit connection, and a small mating surface segment, which makes only a minor contribution. Instead, the mating surface is divided into a plurality of mating surface segments that each contribute essentially comparable holding forces for producing the press-fit connection. Essentially, comparable contributions are ones that differ by no more than 40%. Preferably, there is practically no difference between the holding forces produced by each of the mating surface segments. Naturally, this does not prevent there from also being individual mating surface segments that make only a minor contribution.

The distance of the individual recesses from one another here is great enough that the mating surface segments are essentially rigid in the axial direction. The mating surface segments therefore constitute a sort of "rigid blocks" in the axial direction, which essentially do not deform when the tool shank is subjected to axial forces that have the tendency to pull the tool shank out of the sleeve part or push the shank farther into it. The tool shank is thus clamped in an extremely rigid fashion in the sleeve part of the tool holder.

The depth of the radial recesses that must be selected in order for the press fit to release in an essentially uniform fashion at all mating surface segments under the influence of heat applied over the outer circumference of the sleeve part cannot be estimated in a generally applicable way since the depth for the recesses depends largely on the individual case, in particular the wall thickness of the sleeve part and the nominal diameter of the tool shank to be clamped, i.e. the ratio between these two values. The person of average skill in the art, however, can easily determine this ratio for the specific individual case at hand through simple testing. An essentially uniform release is when the press fits, which the individual mating surface segments form with the tool shank when the sleeve part is cold, release essentially simultaneously after proper application of heat to the outer circumference of the sleeve part so that the removal of the tool shank from the sleeve part is no longer hindered by a single mating surface segment at which the press fit has not yet released.

When the sleeve part embodied according to the invention is used, it is possible to combine the advantages of a thick-walled sleeve part with the advantageous thermal behavior of a thin-walled sleeve part—the deeply incised recesses are only narrow and therefore do not significantly reduce the torsional rigidity or stiffness of the sleeve part. This is true especially because the sleeve part combines with the tool shank to form a unit that has a high geometrical moment of inertia as a whole as long as the press-fit connection exists. On the other hand, the deeply incised recesses weaken precisely the inner core region of the sleeve part that only reacts very late to the externally applied heat and therefore when no recesses are present, hinders the expansion of the sleeve part in the axial direction, resulting in the unwanted warpage of the sleeve part, the prevention or minimization of which is the focus of the present invention.

The use of a sleeve part with thick walls and an embodiment according to the invention is particularly advantageous when clamping milling tools, particularly those intended for machining hard materials or materials that are difficult to machine for other reasons. This is true because undesirable vibrations easily occur specifically with such materials, particularly at the edges of the work piece. These vibrations particularly occur when only a few successive milling tool blades are engaging the work piece simultaneously or when there is a fluctuation in the number of milling tool blades engaging the work piece. In addition, the recesses, if they are embodied with the depth being discussed here, also have a vibration-damping effect since vibrations are not transmitted as well due to the presence of the interruptions in the sleeve part, which are of not insignificant depth.

The invention makes it unnecessary to reduce the undersizing of the fit in order to assure a trouble-free clamping and unclamping—in other words, achieving the benefit of a simple shrinking and unshrinking does not require acceptance of a reduction in the clamping force.

In a preferred embodiment, the mating surface is divided into at least two, preferably three to five, comparable mating surface segments, depending on the axial length of the mating surface. It is of little use to divide the mating surface into a larger number of mating surface segments because this results in excessive weakening and excessive production costs. Still within the scope of this patent, however, it could be possible in the extreme case to also consider dividing the mating surface into six and even up to a maximum of eight segments, with the understanding that this will have certain detrimental repercussions.

In order to produce a tool holder with a very rigid clamping of the tool shank, the thinnest wall thickness of the sleeve part in the region of the mating surface (i.e. in the region situated on the outside next to the mating surface in the radial direction) is embodied to be at least 15 mm, better still at least 17 mm, sometimes even a minimum of 19 mm.

In another advantageous embodiment, the distance between the inner edge of the end bevel and the recess closest to the annular end surface is more than 8 mm, preferably more than 10 mm.

Other advantages, effects, and possible embodiments ensue from the exemplary embodiment described below, which is explained in conjunction with the figures, which are shown to scale and provided with accurate dimensions and whose graphic disclosure content is essential to the exemplary embodiment.

DETAILED DESCRIPTION OF THE PREFERRED EMBODIMENTS

Figure 1:
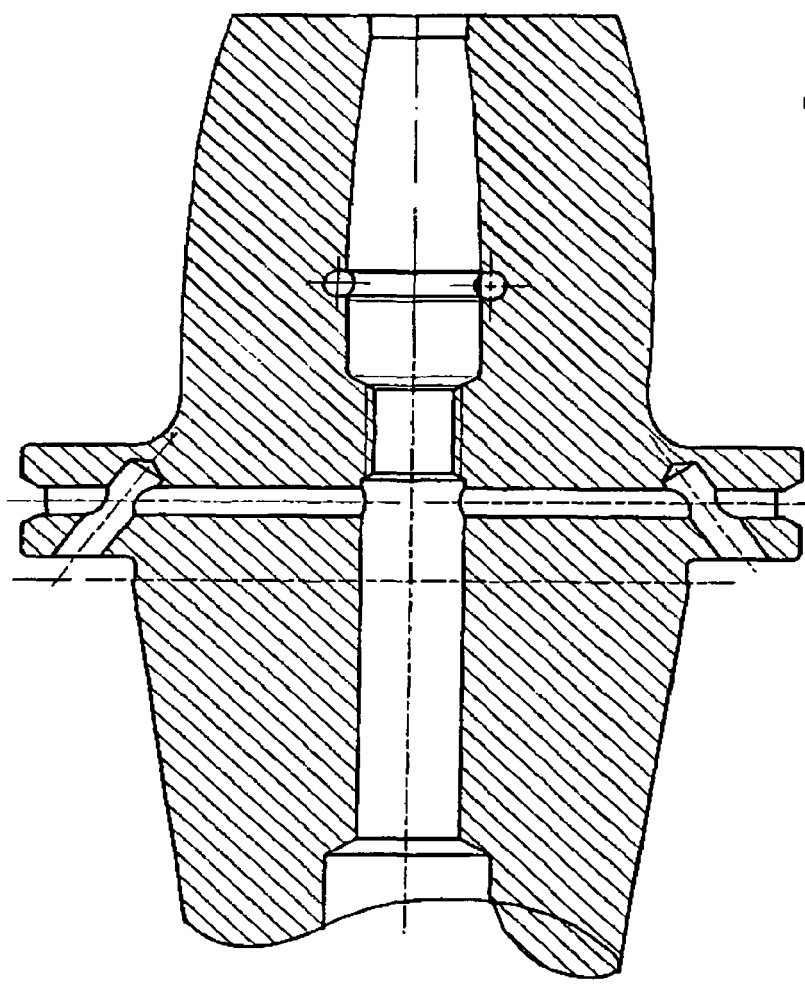
FIG. 1 is a very schematic depiction of the deforming behavior of tool holders known from the prior art, in the region of their sleeve part.

Generally speaking, the steel tool holder shown in FIG. 1, shown under stress without the inserted tool, is a conventionally designed tool holder. At its end oriented away from the sleeve part 2, it is provided with a clamping cone with which it can be fastened to a spindle of a power tool. Instead of a clamping cone, it is also easily conceivable to provide other known clamping systems that are appropriate alternatives for fastening a tool holder to a spindle of a power tool.

At its other end opposite from the clamping cone, the tool holder 1 is provided with a sleeve part 2. The latter has a tool receiving opening 3, which in this case is composed of a cylindrical opening. Over part of its inner surface, this opening is equipped with a mating surface 4. This mating surface 4 is a definite amount smaller than the shank diameter of the tool to be clamped so that when the sleeve part is cold, the shank of the tool is secured in a press fit. As a result, all forces occurring during operation of the tool can be introduced via the press fit into the tool holder 1 and from there, into the power tool—and vice versa. In practice, the shrinking and unshrinking of a tool being inserted into or removed from the tool holder 1 typically takes place in the way described in the previously published German patent application DE 101 02 710 A1, which is hereby included by reference in the subject of the present description.

The sleeve part 2 here is embodied as comparatively thick-walled. In the exemplary embodiment shown in FIG. 2, which is used to clamp a tool with a shank diameter of 16 mm, the minimum wall thickness WS of the sleeve part in the region of the mating surface is slightly more than 17.5 mm.

The mouth of the tool receiving opening 3 is provided with a large bevel, i.e. a section that is not yet part of the mating surface 4, but through its enlarged diameter, facilitates insertion of the respective tool shank.

After this bevel, the mating surface 4 begins, which in the exemplary embodiment shown, is divided into a total of three mating surface segments 4* by two recesses 6 extending in the circumference direction. The recesses 6 are cut into the sleeve part from the mating surface side. The recesses 6 have a depth of 6 mm. Preferably, the depth is uniform in all recesses. In the region of the mating surface, each of the recesses weakens the sleeve part by approximately ⅓ of its wall thickness; as a rule, the weakening is in any case greater than ¼ and less than ½ of the wall thickness.

The width of the recesses in the axial direction is ideally from 1.5 to 3 mm; in this specific case, it is 2 mm.

The mating surface segments 4* thus produced have essentially the same length in the axial direction. In this way, they make approximately comparable force contributions to the press-fit connection, i.e. contributions on a similar order of magnitude—certain differences in the contributions here are as inevitable as they are harmless because the sleeve part in the region of the mating surface has a conical outer contour of approximately 3 to 6 degrees relative to the rotation axis of the tool holder, i.e. does not have a completely constant wall thickness.

Figure 2:
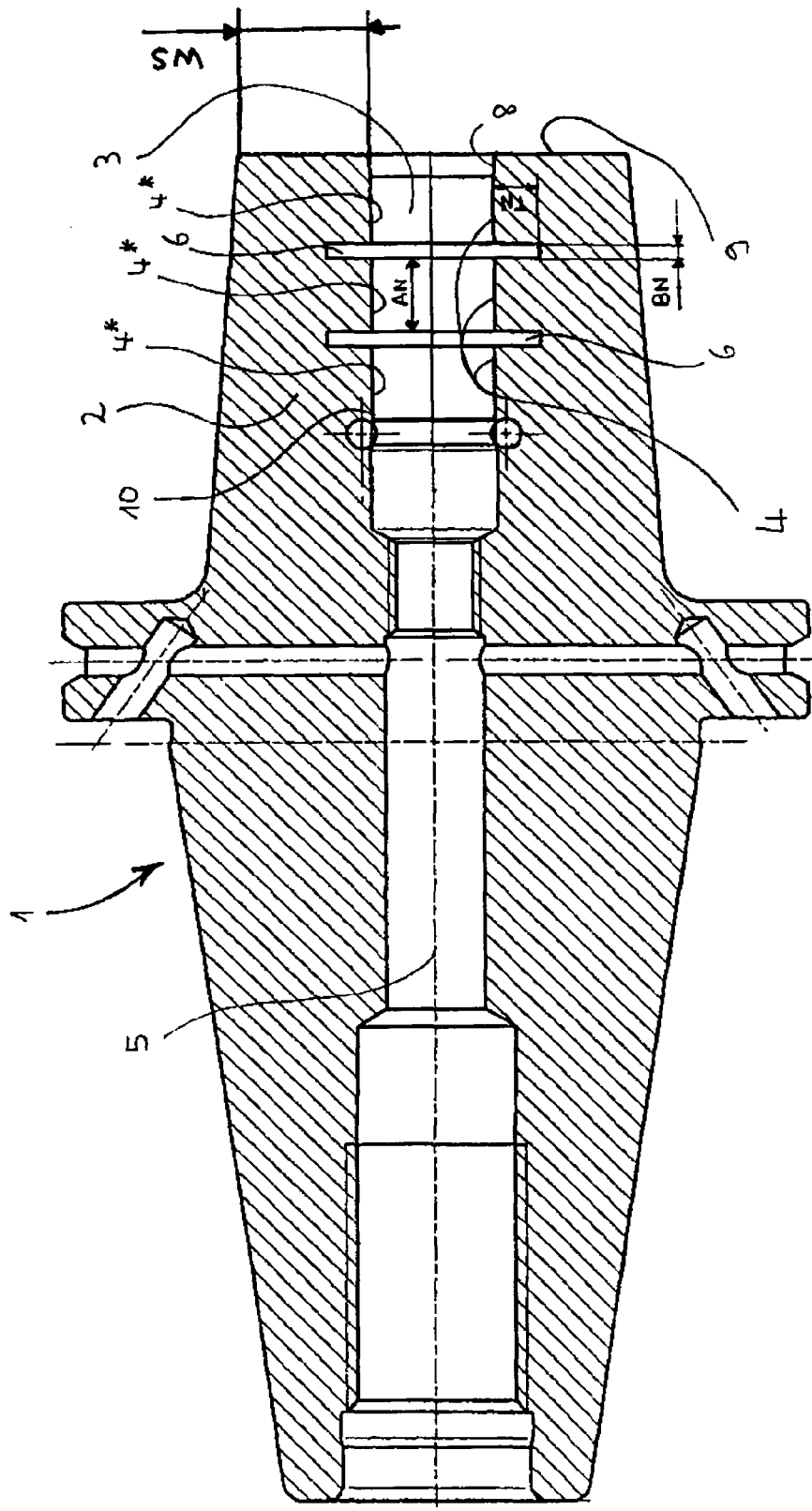
FIG. 2 shows a detailed exemplary embodiment of a tool holder according to the invention.
Figure 3:
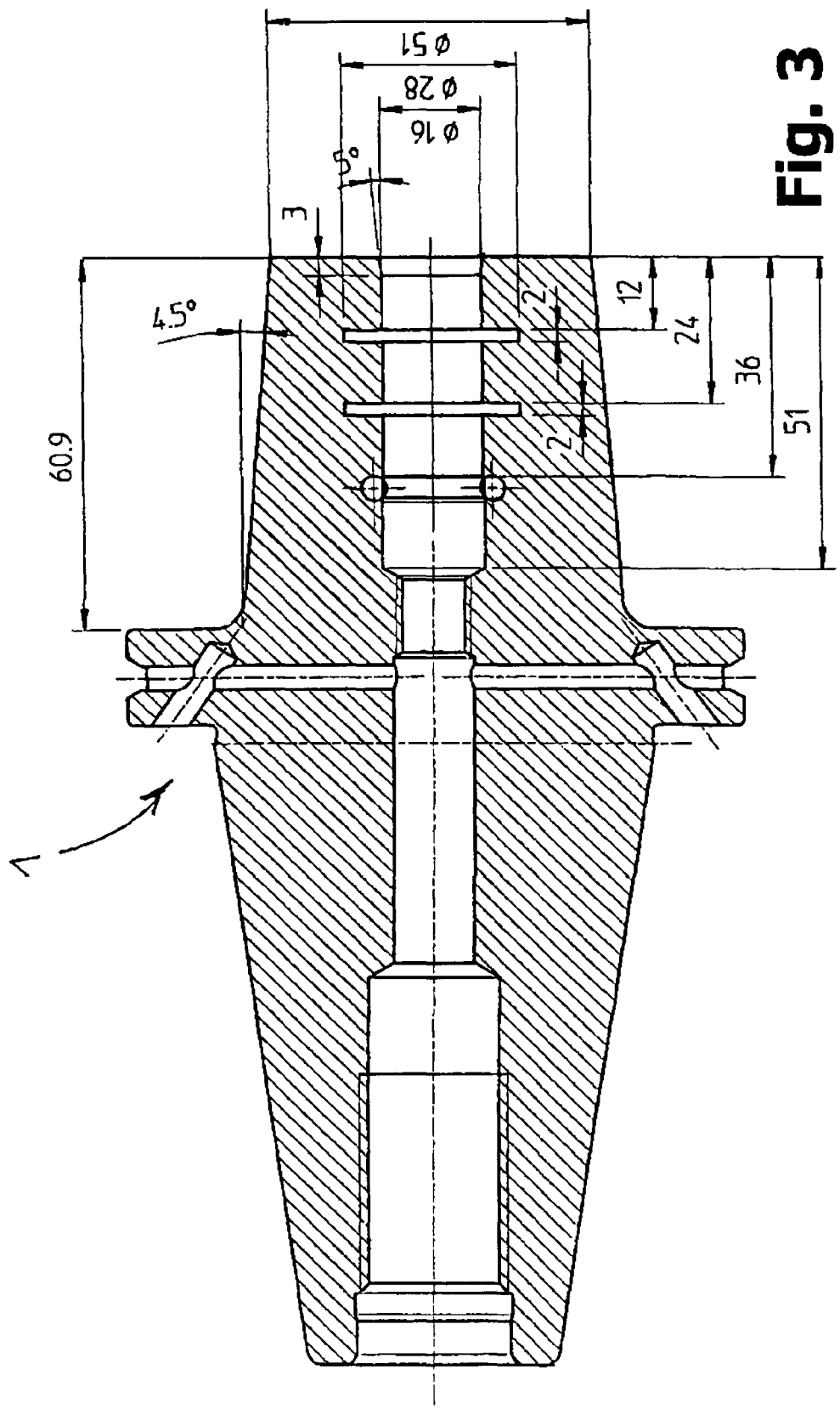
FIG. 3 shows the tool holder according to FIG. 2, but provided with specific dimensions of the parts relevant to the embodiment of the invention.

In the axially inward direction in the exemplary embodiment shown in FIG. 2, the mating surface 4 or more precisely stated, the last mating surface segment 4* is adjoined by a locking mechanism behind which the tool receiving opening comes to an end. Neither the end region nor the locking mechanism is part of the mating surface 4 or even of the invention and therefore neither is of interest here.

Ratios similar to the ones described above for the relevant key values of the specific exemplary embodiment occur even in tool holders intended for clamping tools with larger shank diameters, see the table given at the end of the description.

This table gives the key values of other tool holders in which the mating surface is likewise divided into three respective mating surface segments.

| Shank diameter [mm] | Minimum sleeve wall thickness WS [mm] | Recess depth ET [mm] | Axial length L of mating surface segments [mm] |
|---|---|---|---|
| 40 | 21 | 8 | 18 mm to 28 mm |
| 32 | 19 | 6 | 11 mm to 15 mm |
| 25 | 19 | 6 | 11 mm to 15 mm |
| 20 | 19 | 6 | 10 mm to 13 mm |
| 16 | 17.5 | 6 | 10 mm to 13 mm |

The invention claimed is:

1. A tool holder, comprising:
a tool receptacle in the form of a sleeve part, which has a tool receiving opening with a mating surface concentric to a rotation axis of the tool holder to which it is to fasten a shank of a tool, which has been properly inserted into the tool receiving opening of the sleeve part, in a press fit, and the sleeve part has a plurality of recesses extending in from the mating surface;
wherein the recesses divide the mating surface into at least two and no more than eight comparable mating surface segments that are essentially intrinsically rigid in the axial direction such that the mating surface segments do not deform when the tool shank is subjected to axial forces that have a tendency to pull the tool shank out of the sleeve part or push the shank farther into the sleeve part,
with a radial depth of the recesses that is selected to prevent or minimize warpage of the sleeve part, wherein the radial depth of the recesses is selected according to a wall thickness of the sleeve part and a nominal diameter of the tool shank to be chucked or a ratio between these two quantities, wherein the sleeve part has a wall thickness in the region of the mating surface of at least 15 mm, and the recesses weaken the sleeve part by more than ¼ and by less than ½ of the wall thickness, and the radial depth of the recesses being selected so that the press fit releases in an essentially uniform fashion at all mating surface segments under the influence of heat applied over an outer circumference of the sleeve part.

2. The tool holder as recited in claim 1, wherein the radial depth of the recesses is at least 4 mm.

3. The tool holder as recited in claim 1, wherein a length of the individual mating surface segments in the axial direction is between 10 and 30 mm.

4. The tool holder as recited in claim 1, wherein a distance between an inner edge of an end bevel and the recess closest to an annular end surface is at least four times an axial recess depth measured in an axial direction.

5. The tool holder as recited in claim 4, wherein a distance between an inner end of the mating surface and the recess farthest from the annular end surface is at least our times the recess depth.

6. The tool holder as recited in claim 1, wherein the recesses divide the mating surface into at least three and no more than five comparable mating surface segments that are essentially intrinsically rigid in the axial direction.

\* \* \* \* \*